(12) United States Patent (10) Patent No.: US 9,116,516 B2
Mullin (45) Date of Patent: Aug. 25, 2015

(54) SYSTEM AND METHOD FOR ACTUATOR CONTROL

(75) Inventor: Francis P. Mullin, Lisburn (IE)

(73) Assignee: ABB Technology AG, Zurich (CH)

( * ) Notice: Subject to any disclaimer, the term of this patent is extended or adjusted under 35 U.S.C. 154(b) by 508 days.

(21) Appl. No.: 13/532,836

(22) Filed: Jun. 26, 2012

(65) Prior Publication Data

US 2013/0024013 A1 Jan. 24, 2013

Related U.S. Application Data

(60) Provisional application No. 61/510,183, filed on Jul. 21, 2011.

(51) Int. Cl.
G05B 19/042 (2006.01)

(52) U.S. Cl.
CPC .. *G05B 19/0428* (2013.01); *G05B 2219/24033* (2013.01)

(58) Field of Classification Search
CPC .................. G05B 2219/24033; G05B 19/0428
USPC ........ 700/21, 28–31, 79; 701/363, 29.7–29.8, 701/30.3–30.9, 31.1, 501; 702/47, 91–93, 702/127, 150; 324/177, 179, 243, 207.2
See application file for complete search history.

(56) References Cited

U.S. PATENT DOCUMENTS

| 4,214,301 | A |   | 7/1980 | Kurihara et al. |           |
|-----------|---|---|--------|-----------------|-----------|
| 4,509,110 | A | * | 4/1985 | Levesque et al. | 700/33    |
| 5,233,512 | A | * | 8/1993 | Gutz et al.     | 700/30    |
| 5,570,300 | A |   | 10/1996| Henry et al.    |           |
| 6,262,552 | B1| * | 7/2001 | Sorsa et al.    | 318/594   |
| 6,304,077 | B1| * | 10/2001| Sorsa et al.    | 324/207.2 |
| 6,850,857 | B2| * | 2/2005 | Ignagni et al.  | 702/104   |
| 6,970,003 | B2| * | 11/2005| Rome et al.     | 324/718   |
| 7,107,176 | B2| * | 9/2006 | Henry et al.    | 702/127   |
| 7,426,449 | B2| * | 9/2008 | Henry et al.    | 702/127   |
| 7,454,255 | B1| * | 11/2008| Boskovic et al. | 700/79    |
| 8,457,809 | B2| * | 6/2013 | Lee et al.      | 701/2     |
| 8,475,275 | B2| * | 7/2013 | Weston et al.   | 463/39    |
| 8,645,022 | B2| * | 2/2014 | Yoshimura et al.| 701/32.8  |
| 8,657,886 | B2| * | 2/2014 | Clausen et al.  | 623/24    |
| 2002/0092569 | A1 | * | 7/2002 | Maung        | 137/554   |
| 2003/0088381 | A1 | * | 5/2003 | Henry et al. | 702/127   |
| 2004/0232052 | A1 | * | 11/2004 | Call et al. | 209/143   |
| 2006/0232052 | A1 | * | 10/2006 | Breed       | 280/735   |
| 2009/0099810 | A1 | * | 4/2009 | Schneider et al. | 702/150 |
| 2012/0232756 | A1 | * | 9/2012 | Yuan et al.  | 701/41    |

* cited by examiner

*Primary Examiner* — Ramesh Patel
(74) *Attorney, Agent, or Firm* — Stevens & Showalter LLP

(57) ABSTRACT

Information from a real sensor and a virtual sensor are fused to form a hybrid sensor. Control signals (and/or the absolute value of the control signals) applied to an actuator are accumulated and converted to a position the actuator should be in based on the accumulated control signals to form the virtual sensor. The actuator position from the virtual sensor is fused with an actuator position from a real sensor to form the hybrid sensor. Small periodic corrections can be made to the accumulating control signals to maintain or achieve, if possible, correlation between the virtual sensor and the real sensor over time. The corrections slowly decrement errors in the actuator position indicated by the virtual sensor. Accumulating numerical errors in the accumulating control signals are reduced and the significance of long past events is de-emphasized by a forgetting factor ($k_{ff}$) used at defined periods of time ($t_{ff}$).

18 Claims, 7 Drawing Sheets

SYSTEM AND METHOD FOR ACTUATOR CONTROL

RELATED APPLICATION

This application claims the benefit of U.S. Provisional Application No. 61/510,183, filed Jul. 21, 2011 and entitled "SYSTEM AND METHOD FOR ACTUATOR CONTROL," the disclosure of which is incorporated herein by reference.

FIELD OF THE INVENTION

The present invention relates in general to actuators used to control processes in manufacturing facilities. More particularly, the present invention relates to a system and method for actuator control wherein the positioning of actuators and sensor validation of the actuator positions are controlled by combining or fusing data from physical or real sensors with data from virtual sensors, both of which are used to monitor the actuators. While it will be apparent that the control techniques of the present invention can be used in a wide variety of applications, the invention will be described herein with reference to actuators used in paper making machines for which the invention was developed and is initially being used.

BACKGROUND OF THE INVENTION

Closed loop feedback systems are well known in the art as a means of controlling process variables in manufacturing facilities, for example the positioning of an actuator to a desired position. Feedback mechanisms and control algorithms are used to drive a perceived error signal to a minimum value. However the premise of feedback control is that the feedback position is that of an error free state.

When sensors are used to monitor actuators, normally the sensors are single element feedback devices. Such sensors are able to provide good feedback either under dynamic conditions or near static conditions, but usually not both. The level of precision and accuracy required from such sensors, particularly those capable of broadband operation, often exceeds what is commercially available at costs that are practical for use in industrial control applications.

When actuator sensors fail abruptly, the failures are generally easily detected with the unfortunate result that feedback from the failed sensors is totally unusable. The only course of action in this instance is to prevent any further control actions of the actuator in order to prevent potentially catastrophic or permanent damage to system components, which severely disrupts the performance of the machine on which the actuators are being used.

When sensor noise levels are near the signal level required for control, closed loop feedback systems may induce oscillations in the controlled process. In paper making machines, particularly sensitive headbox control systems have been observed to experience this phenomenon. Currently the solution to oscillation problems is to widen control deadbands, which results in reduction of precision in the control and slower process response times.

It has also been observed that very slowly occurring drifts or errors, such as those displayed by progressively deteriorating sensor hardware, can be hidden within the closed loop control typical of actuators using feedback control. Such hidden drifts or errors can render the control mechanism and/or typical alarming structure totally useless.

SUMMARY OF THE INVENTION

A system and method for improved control of actuators creates hybrid, soft or smart sensors by fusing information generated by at least one physical or real sensor with information generated by at least one virtual sensor. Virtual sensing may be performed by accumulating control signals, and/or the absolute value of the control signals, applied to an actuator, for example by counting steps applied to a stepper motor, to effectively integrate the control signals and/or the absolute value of the control signals. The accumulated control signals are converted to a corresponding position to which the actuator would be located based on the accumulated control signals. The resulting virtual best guess position of the actuator is used together with the physically sensed best guess position of the actuator from the real sensor to form the hybrid, soft or smart sensor. As used herein, fused, fusing or fusion refers to the use or combination of the signals to form the hybrid sensor.

Minor periodic corrections can be made to the accumulating control signals in order to maintain or achieve, if possible, correlation between the virtual sensor and the real sensor over time. The corrections slowly decrement errors in the actuator position indicated by the virtual sensor. To mitigate against accumulating numerical errors in the accumulating control signals and also to decrease the significance of events that happened long in the past, a forgetting factor ($k_{ff}$) can be used at defined periods of time ($t_{ff}$) so that the accumulating control signals are reduced by a certain proportion of their current values.

In accordance with one aspect of the teachings of the present application, a system for actuator sensor fusion comprises at least one real sensor coupled to an actuator and generating real sensor signals and at least one virtual sensor generating virtual sensor signals based on signals used to control the actuator. A processor fuses the real sensor signals and the virtual sensor signals to detect failure of the actuator and/or the at least one real sensor. The processor may be configured to revert to operation of the actuator using the at least one virtual sensor upon sensed failure of the at least one real sensor. The processor may model the at least one virtual sensor and accumulate historical tracking data representative of control signals sent to the actuator.

The processor may be configured for fusing the real sensor signals and the virtual sensor signals by comparing a position of the actuator indicated by the real sensor signals and a position of the actuator indicated by the virtual sensor signals to determine a difference in indicated position of the actuator and to indicate a failure of the actuator and/or the at least one real sensor upon the difference in indicated position exceeding a difference limit.

The processor may be configured to accumulate periodic corrections made to the virtual sensor and compare the accumulated periodic corrections to a limit to determine deterioration of the actuator and/or the real sensor. The processor may also be configured to apply a forgetting factor ($k_{ff}$) at defined periods of time ($t_{ff}$) to the accumulating periodic corrections so that the accumulating periodic corrections are periodically reduced by a certain proportion of their current values.

The processor may be configured to accumulate absolute values of the periodic corrections made to the virtual sensor and compare the accumulated absolute values of the periodic corrections to a limit to determine deterioration of the actuator and/or the real sensor. The processor may be further configured to apply a forgetting factor ($k_{ff}$) at defined periods of time ($t_{ff}$) to the accumulating periodic corrections and to apply a forgetting factor ($k_{ff1}$) at defined periods of time ($t_{ff1}$) to the accumulating absolute values of the periodic corrections so that the accumulating periodic corrections and the accumulating absolute values of the periodic corrections are periodically reduced by certain proportions of their current values.

The processor may be configured to accumulate the absolute values of periodic corrections made to the virtual sensor and to compare the accumulated absolute values of the periodic corrections to a limit to determine deterioration of the actuator and/or the real sensor. In this event, the processor may be configured to apply a forgetting factor ($k_{fn}$) at defined periods of time ($t_{fn}$) so that the accumulating absolute values of the periodic corrections are periodically reduced by a certain proportion of their current values.

In accordance with another aspect of the teachings of the present application, a method for actuator sensor fusion comprises monitoring, using a processor, at least one real sensor coupled to an actuator; monitoring, using a processor, at least one virtual sensor; and fusing, using a processor, real sensor signals generated by the real sensor and virtual sensor signals generated by the virtual sensor to detect failure of the actuator and/or the at least one real sensor. The method may further comprise reverting to operation of the actuator using the at least one virtual sensor upon sensed failure of the at least one real sensor.

The method may further comprise modeling the at least one virtual sensor and accumulating historical tracking data representative of control signals sent to the actuator. Fusing the real sensor signals and the virtual sensor signals may comprise comparing a position of the actuator indicated by the real sensor signals and a position of the actuator indicated by the virtual sensor signals; determining a difference in indicated position of the actuator; and indicating a failure of the actuator and/or the at least one real sensor upon the difference in indicated position exceeding a difference limit.

The method may further comprise accumulating periodic corrections made to the virtual sensor; and comparing the accumulated periodic corrections to a limit to determine deterioration of the actuator and/or the at least one real sensor. In this event, the method may further comprise applying a forgetting factor ($k_{ff}$) at defined periods of time ($t_{ff}$) to the accumulating periodic corrections so that the accumulating periodic corrections are periodically reduced by a certain proportion of their current values.

The method may further comprise accumulating both periodic corrections made to the virtual sensor and the absolute magnitude of periodic corrections made to the virtual sensor; and comparing the accumulations limits to determine deterioration of the actuator and/or the at least one real sensor. In this event, the method may further comprise applying, using a processor, a forgetting factor ($k_{ff}$) at defined periods of time ($t_{ff}$) to the accumulating periodic corrections; and applying, using a processor, a forgetting factor ($k_{fn}$) to the accumulating absolute values of the periodic corrections at defined periods of time ($t_{fn}$) so that the accumulating periodic corrections and the accumulating absolute values of the periodic corrections are periodically reduced by certain proportions of their current values.

The method may further comprise accumulating, using a processor, the absolute values of periodic corrections made to the virtual sensor; and comparing the accumulated absolute values of the periodic corrections to a limit to determine deterioration of the actuator and/or the real sensor. In this event, the method may further comprise applying, using a processor, a forgetting factor ($k_{fn}$) at defined periods of time ($t_{fn}$) so that the accumulating absolute values of the periodic corrections are periodically reduced by a certain proportion of their current values.

BRIEF DESCRIPTION OF THE DRAWINGS

The benefits and advantages of the invention of the present application will become apparent to those skilled in the art to which the invention relates from the subsequent description of the illustrated embodiments and the appended claims, taken in conjunction with the accompanying drawings, in which:

DETAILED DESCRIPTION OF THE INVENTION

Figure 1:
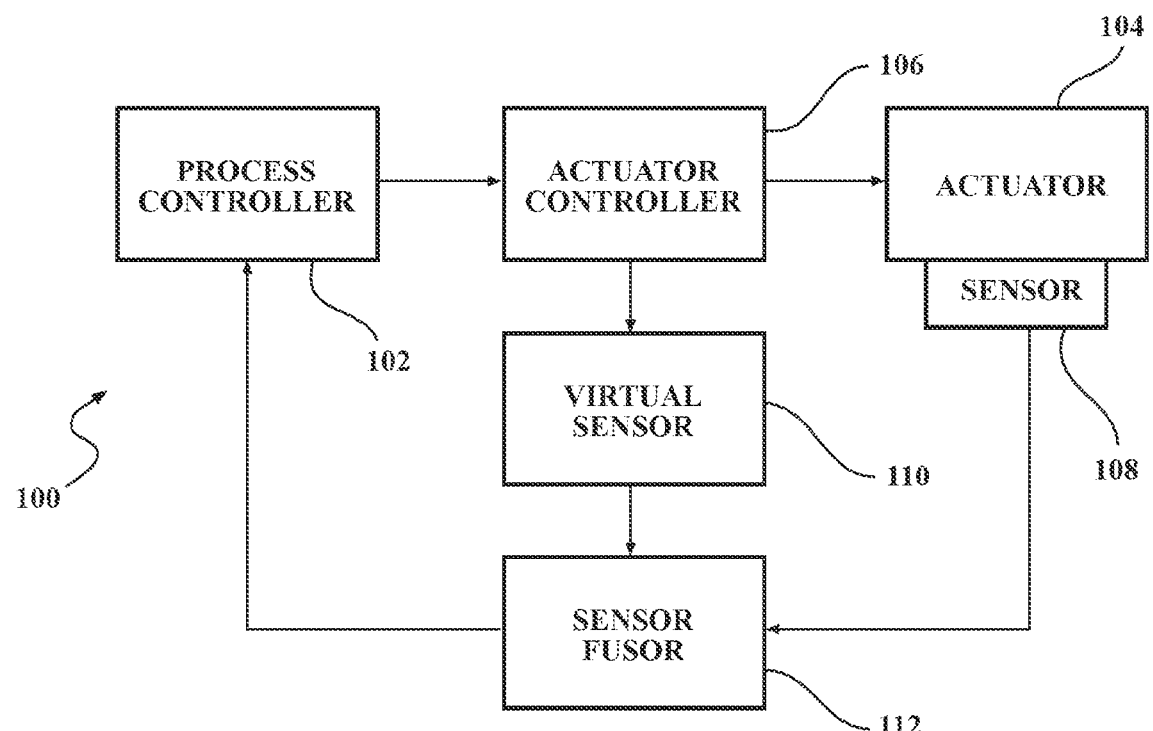
FIG. 1 is a block diagram of a system operable in accordance with the teachings of the present application.

The system and method of the present application will be described with reference to controlling actuators of a paper making machine for which it was developed and is initially being used. However, it will be apparent to those skilled in the art that the present invention can be used in a wide variety of applications.

A system and method for improved control of actuators is disclosed for creation of hybrid sensors, which also may be referred to herein as soft sensors or smart sensors, by fusing information generated by at least one real sensor with information generated by at least one virtual sensor. In papermaking machines, multiple actuators are used to control the process, for example, multiple headbox actuators are used to control a headbox slice lip opening. The headbox actuators need very high levels of accuracy in order to precisely position the slice lip. Most slice lip actions are small in magnitude and occur gradually over time so that if actuator sensors are used, they must perform well for small and slowly varying movements that show little change. However, some slice lip actions are relatively large and requiring rapidly varying movements. For example, relatively large, rapidly varying movements may be performed globally across the entire headbox when paper grade changes are made. The larger actuator movements still require a high level of accuracy to ensure slice bend protections are maintained to prevent damage to the slice lip during these large movements. Thus, actuator sensors for monitoring headbox actuators must also perform well during relatively large and rapid movements of the actuators. Accordingly, actuator sensors that perform well during both relatively static and relatively dynamic circumstances are required.

Since sensors having broad bandwidth are normally expensive, their use may not be practical in many applications, particularly applications requiring a large number of actuators such as headbox slice lip control where many actuators and correspondingly many sensors are required for large width paper making machines. In accordance with the teachings of the present application, information from different sources is intelligently fused to extend the functionality of sensors beyond the conventional simple comparison of their output signals to limits for those signals so that commercially available relatively economic sensors can be used.

With knowledge of the characteristics of an actuator, an open loop model can be developed and used to track the history of the actuator commands to create a virtual sensor. The tracking history of this virtual sensor is then used to generate secondary measurements values (MV) or estimates of actuator movements or actuator position that can be compared to measurement values based on a physical sensor monitoring the actuator. Thus, data fusion techniques are applied to primary measurements made by a physical sensor and secondary measurements made by the virtual sensor in order to effect higher quality measurements and measurement consistency by means of error estimation, tracking and adaption of the system.

FIG. 1 shows a simplified system 100 operable in accordance with the teachings of the present application wherein a process controller 102 controls an actuator 104, typically one of many actuators, via an actuator controller 106. A hardware sensor 108 monitors the actuator 104 and generates physical or real sensor signals representative of measured actuator movement. The sensor 108 may take whatever form may be appropriate for a given application such as a typical linear variable differential transformer (LVDT) in linear actuator applications, rotary sensors for rotary actuators and even rotary sensors at an appropriate location in the linear actuator assembly, with appropriate modeling. Using the sensor 108 specifications and normal statistical and/or systemic error characteristics as well as measurements taken on the sensor 108, the operating characteristics of the sensor 108 are determined. The determined operating characteristics are then used to produce an open loop model appropriate for normal operating conditions of the actuator/sensor 104/108 combination. Open loop modeling is well known to those skilled in the art and will not be described beyond what is necessary for an understanding of the system and method for improved actuator control in accordance with the teachings of the present application.

A virtual sensor 110 continuously tracks commands issued (or step movement if implemented with a step encoder) to generate virtual sensor signals which define an estimated position of the actuator 104. Output signals or estimated actuator position signals from the virtual sensor 110 tend to be very accurate in the short term and in step-to-step mode, but tend to drift slowly out of accuracy since the actuator is a physical device and does not respond in exact accordance with the commands sent to control it. For example, steps may be mis-actioned due to low torque for early steps of a stepper motor. Since the virtual sensor 110 is an integrative device, over a large period of time the sensor drift error may be unbounded.

Signals from the physical or hardware sensor 108 are compared to signals from the virtual sensor 110 in a sensor fusor 112 to determine and track differences between the physically sensed position of the actuator 104 and the computed position of the actuator 104 determined by the virtual sensor 110. The real sensor data and the virtual sensor data are combined to provide a higher grade of position data from the hybrid sensor, soft or smart sensor defined by using the teachings of the present application. Sensor fusion is not limited to one physical and one virtual sensor but many sources of data can be fused in accordance with the teachings of the present application. The virtual sensor 110 and the sensor fusor 112 can be implemented in one or more dedicated processors or a processor associated with the controller of the system using the actuator 104 including the virtual sensor 110 and the sensor fusor 112. The hybrid, soft or smart sensor can also determine considerably more information regarding the health of the sensor 108 and the actuator 104 and thereby increase the intelligent utility of the equipment.

Figure 2:
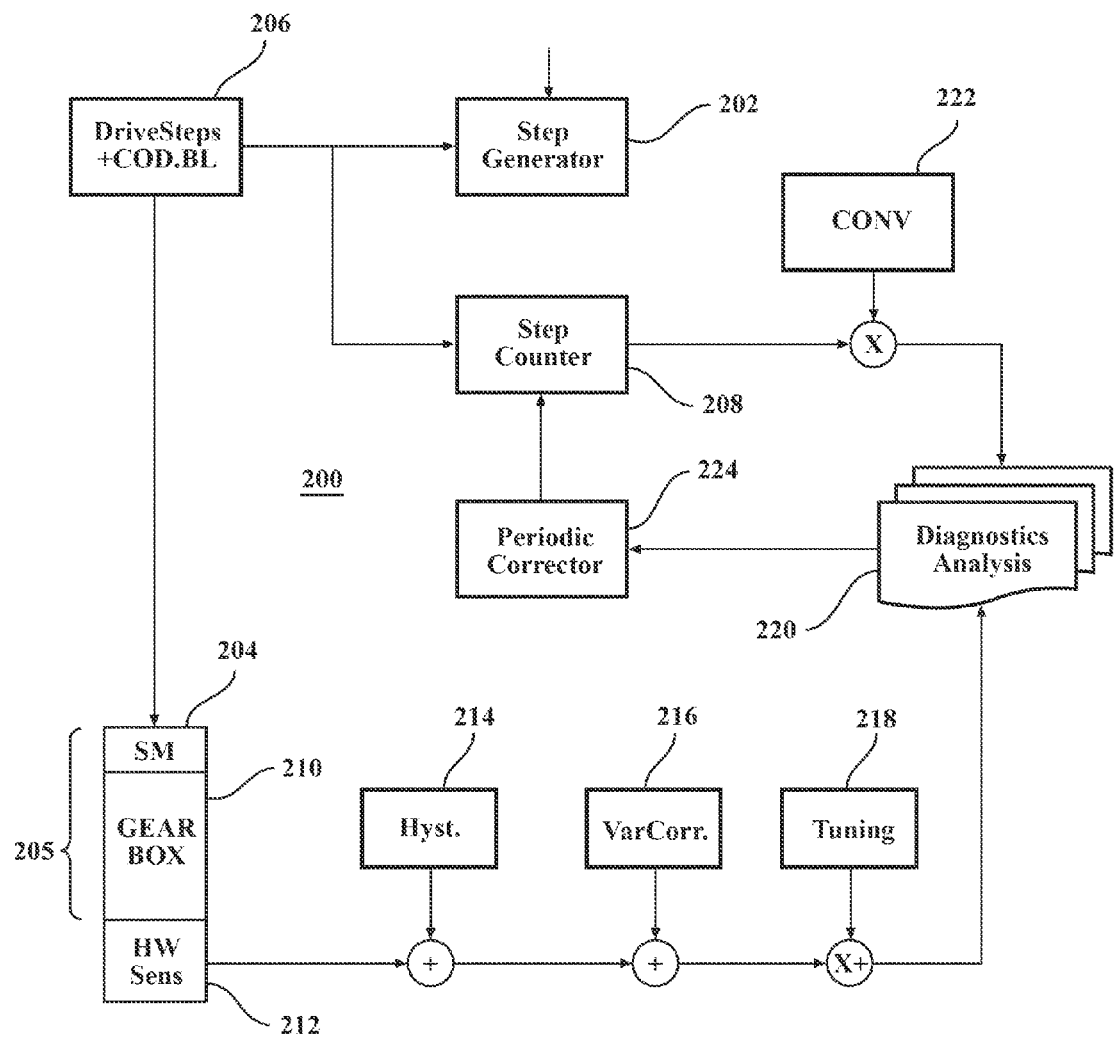
FIG. 2 is a block diagram of an illustrative embodiment of a hybrid sensor in accordance with the teachings of the present application.

FIG. 2 is a block diagram of one possible embodiment of a hybrid sensor 200 in accordance with the teachings of the present application wherein the actuator is illustrated as a stepper motor. Control setpoint changes are passed to a step generator 202 which converts the setpoint changes to an appropriate number of steps to be applied to a stepper motor 204 of an actuator 205. The step signals are passed to a backlash compensator 206 and a step counter 208 which counts the steps to integrate the control signals passed to the actuator 205 through the compensator 206 as part of the virtual sensor. The backlash compensator 206 adjusts the number of steps to account for backlash in a gearbox 210 of the actuator 205 when directional changes are made. For example, if a reversing step count of 10 steps is to be made, 15 steps may be necessary to compensate for backlash in the associated actuator gearbox 210. Operating characteristics of the backlash compensator 206 are normally empirically determined. A hardware sensor 212 is coupled to the actuator 205 in a conventional manner to monitor the position of the actuator 205 as is known in the art.

While the output of the sensor 212 may be used directly, in the embodiment illustrated in FIG. 2, the output of the sensor is modified to account for physical characteristics of the sensor 212 and the system and environment in which the sensor is used. For example, when the sensor 212 is moved in one direction and then moved back in the opposite direction, there is a slight mismatch or hysteresis in the sensor 212 output which is akin to backlash in the gearbox 210 of the actuator 205. This mismatch is compensated using a hysteresis corrector 214. Hysteresis of the sensor 212 can be determined based on specifications for the sensor 212 and/or by tests performed on the actual sensor being used. A variability corrector 216 is also provided to compensate for variations from ideal characteristics representative of the sensor 212 since the sensor 212 is a real, physical device that varies from nominal characteristics. For example, a linear sensor having a linear characteristic will normally vary from an ideal straight line so that if nonlinear corrections are made, they will improve the accuracy of the sensor's output. The sensor 212 can be further tuned to account for other variations from ideal as indicated by a tuning corrector 218. For example, the tuning corrector 218 can compensate for sensor variations due to temperature.

The direct output (or compensated/tuned output) of the sensor 212, which represents the best guess of the position of the actuator 205 based on measurements made by the sensor 212, is passed to a diagnostics/analysis module 220 for fusion with a best guess of the position of the actuator 205 that is made by virtual sensing. Virtual sensing is performed in the embodiment of FIG. 2 by the step counter 208 that counts the steps from the step generator 202 that are applied to the actuator 205. The step counter 208 effectively integrates the steps received from the step generator 202. The output of the step counter 208 is converted to a corresponding position to which the actuator 205 would ideally have moved based on the actuator 205 having received the number of steps that have been accumulated by the step counter 208 by a step converter 222. The resulting calculated best guess position of the actuator 205, which is the output of the virtual sensor of the embodiment of FIG. 2, is also passed to the diagnostics/analysis module 220 for fusion with the best guess of the position of the actuator 205 from the sensor 212.

As will be more fully explained hereinafter, minor periodic corrections will be made to the step counter 208 by a periodic corrector 224 if limiting conditions are met in order to maintain or achieve, if possible, correlation between the virtual sensor and the hardware sensor over time. The corrections made by the periodic corrector 224 slowly decrement numerical errors in the actuator position indicated by the virtual sensor. These numerical errors may be due to rounding resulting from the finite precision of floating real values in numerical computations, the discrete nature of steps, infrequently missed motor steps in start-ups which can result from stepper coils being unpowered or having low holding current when not in use to reduce quiescent power requirements, misalignment with home position, possible sensor drifts or the like. In working embodiments of the system and method for improved control of actuators of the present application, periodic corrections were made once every 1 minute, at a magnitude of 0.7 microns (for linear corrections), or 0.1 degree (for rotary corrections).

With this understanding of the system and method for improved control of actuators in accordance with the teachings of the present application, statistic tracking and sensor fusion will now be described to provide a better understanding of an illustrated embodiment of the invention. In order to track sensor and motor performance, the following statistics are tracked:

Current variance between the hardware sensor and the virtual sensor—(H2SΔ)

Summation of periodic corrections ("direction" sensitive)—(Σ(correction))

Summation of absolute periodic corrections (not "direction" sensitive) (Σ|correction|)

These statistics are zeroed on startup of the machinery including the actuator and are accumulated over the on-time of an actuator. As a means of mitigating against accumulating numerical errors in the statistics and also of decreasing the significance of events that happened a long time ago and thereby place more emphasis on recent events, a forgetting factor ($k_{ff}$) can be implemented. Using the forgetting factor ($k_{ff}$) periodically based on a defined period of time ($t_{ff}$), the statistic accumulators are reduced by a certain proportion of their current values. For example, if $t_{ff}$ is set equal to one hour and $k_{ff}$ is set equal to 0.90, at hourly intervals:

$$\Sigma(\text{correction}) = \Sigma(\text{correction}) \cdot 0.90; \text{ and}$$

$$\Sigma|\text{correction}| = \Sigma|\text{correction}| \cdot 0.90$$

The forgetting factor also helps mitigate against rogue random effects falsely triggering detections of problems and different forgetting factors and different periods of time for application of the forgetting factors can be used in accordance with the teachings of the present application.

The values of $t_{ff}$ and $k_{ff}$ are determined from consideration of the desired detection rates for sensor drift, motor slippage or the like. Shorter time periods and/or smaller proportional adjustments increase the levels of drift, motor slippage or the like required for detection of a problem. In a working embodiment, $t_{ff}$ was set equal to one hour and $k_{ff}$ was set equal to 0.98. By using a forgetting factor, the possibility of a correction made in the distant past contributing to the triggering of any alarms at the current time is decreased. Thus when a forgetting factor is used, a 1% correction that occurred 1 hour ago, and another 1% correction that was currently required should start to raise alarms, but a 1% correction that occurred 7 months ago and the same 1% change that occurs now are probably nothing to be concerned about so no alarms should be raised. It should be apparent that careful tuning is required among the rate of periodic corrections, the magnitude of the periodic corrections, alarm thresholds and the rate of forgetting. As an example, a $k_{ff}$ of 0.95 and a $t_{ff}$ of 2 hours takes just over a day, about 26 hours, to reduce the importance of an event by 50%, a further day, to reduce the historical importance of an event to 25%, and so on.

Σ(correction) is an indication of sensor drift and Σ|correction| is an indication of motor slippage, considering that on average, a motor will be controlled to approximately the same position and slippage may occur in both directions, expected equally, averaged over a period of time. Even though referred to as statistics, it is noted that H2SΔ, the Σ(correction) accumulator and the Σ|correction| accumulator are indications only, and not mathematically rigorous statistics, due to the way that both slippage and drift will have stochastic effects on both accumulators.

Figure 3:
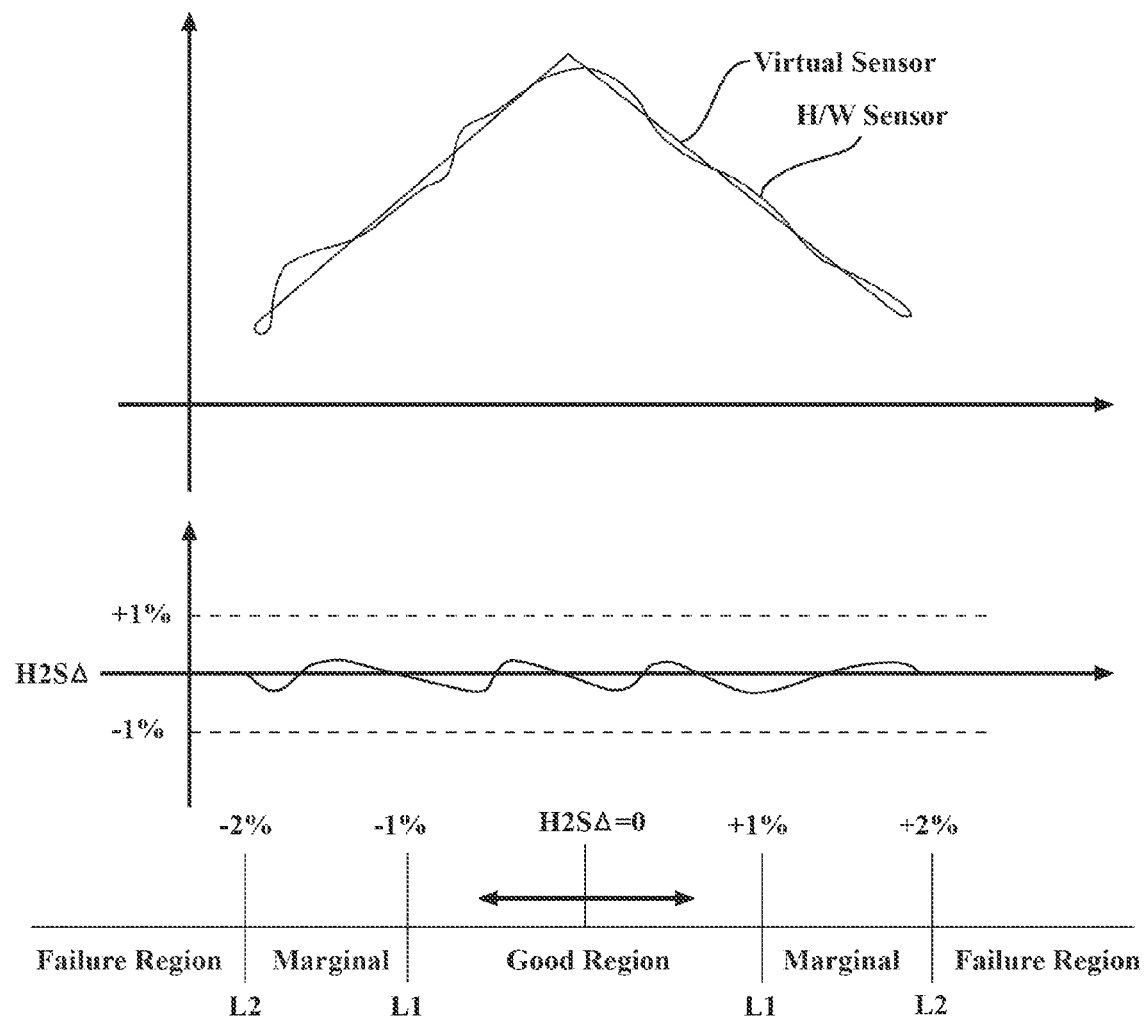
FIG. 3 illustrates operations of an illustrative embodiment of a hybrid sensor in accordance with the teachings of the present application.

FIG. 3 illustrates comparisons between the hardware sensor and the virtual sensor values (H2SΔ) and variance regions where the periodic corrector 224 is active. The difference limits are illustrated as having values of 1% (L1) and 2% (L2) of the total sensor range. The illustrated difference limits, L1 and L2, were selected for testing purposes and it should be apparent that other percentage values, fixed values or other appropriate values can be used for given applications using the teachings of the present application. As shown in FIG. 3, if the variance between the hardware sensor and the virtual sensor, H2SΔ, is within ±1% of total sensor range of being in agreement with one another, the virtual sensor is determined to be good and the value of the virtual sensor is generally used since it has the higher resolution.

If the hardware and virtual sensors almost agree with one another such that the variance between the hardware sensor and the virtual sensor, H2SΔ, is between 1% and 2% of total sensor range of being in agreement with one another, then the variance is considered to be marginal and the periodic corrector 224 is activated. For example, if the virtual sensor was consistently high by 1.5%, possibly due to poor initialization, a short one-time motor stick, uncertainty upon startup of which direction the motor was last moving or the like, then over a period of time, the periodic corrections would slowly bring the hardware sensor and the virtual sensor back into acceptable alignment or correlation, i.e., agreement within 1%. If such a one-time event was corrected and if no further symptoms have appeared, the system has been safely corrected for the sensor discrepancy.

If a major fault is detected as indicated in the illustrated embodiment of FIG. 3 by the variance between the hardware sensor and the virtual sensor, H2SΔ, being greater than 2% of total sensor range (Failure Region), then a determination is made as to what result is to be used. On motor faults, the hardware sensor should be used as this is the indication of the physical output. If a hardware sensor failure is detected, then the virtual sensor provides an indication of the physical output state.

Figure 4:
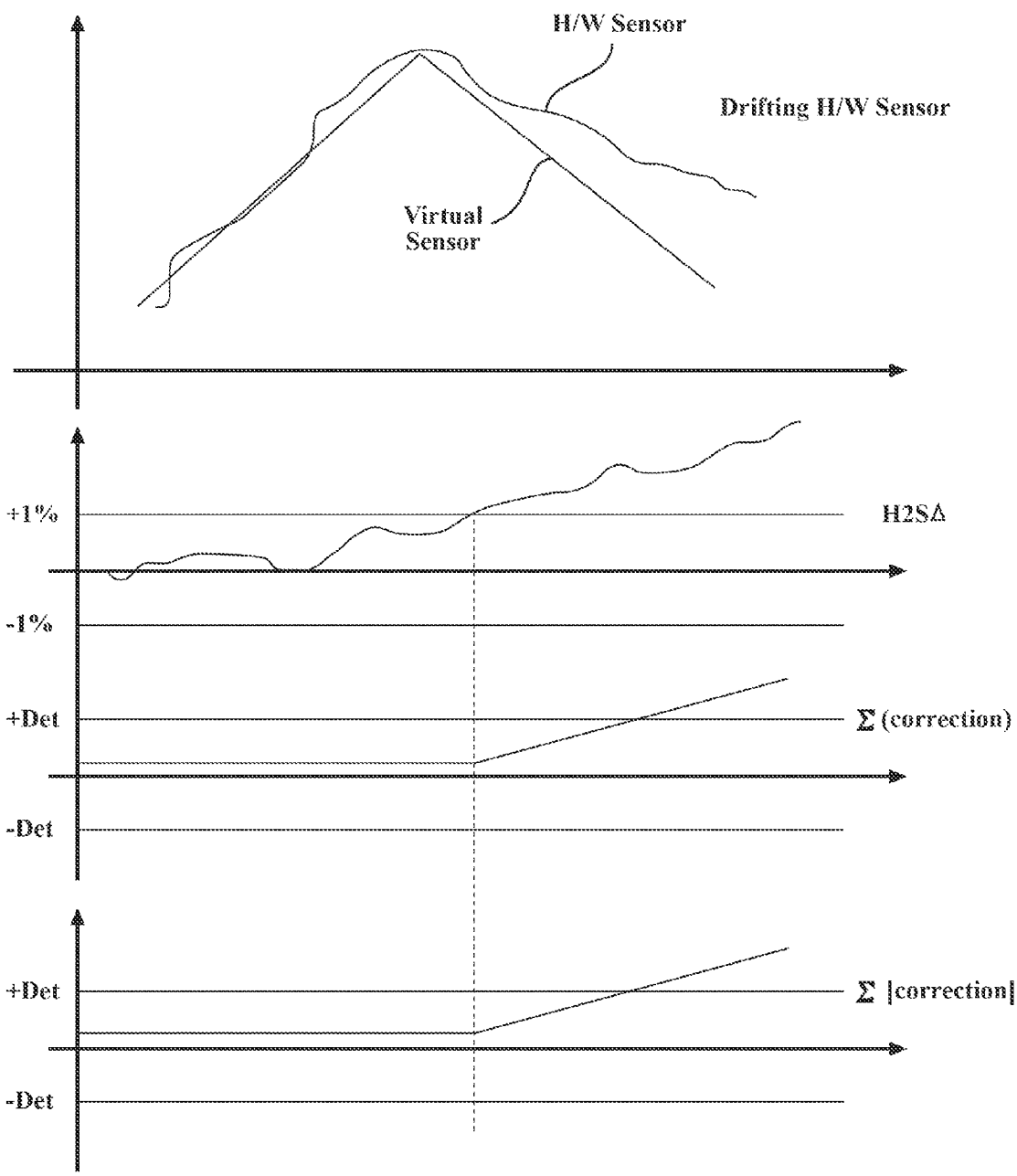
FIG. 4 illustrates operation of an illustrative embodiment of a hybrid sensor in accordance with the teachings of the present application for a slow hardware sensor drift.

The following examples illustrate responses using the monitored statistics in accordance with the teachings of the present application. The first example shown in FIG. 4 (wherein +Det and −Det are positive and negative detection thresholds, respectively) illustrates a slow hardware sensor drift which was a condition that previously would have gone undetected in actuator control systems. Previously, any small error (below the threshold of unexpected movement) that occurred between control scans, was subsequently masked by the feedback quality control system (QCS) performing a control action. Ultimately the drifting sensor would only have been detected when an actuator breached slice lip bend limits even though physically the slice/actuator was where it was required to be from a process control point of view. This could have taken several hours since bend limit values could typically be ±500 microns, so a sensor drift well in excess of 500 microns could be needed. All statistics in FIG. 4 show a diverging value from the ideal center lines. Upon detection of the drifting sensor using the teachings of the present application, a possible action would be to raise an alert that the sensor is sub-optimal. By early detection of the drifting sensor, rather than having to wait for an actuator limit to be exceeded, lockout of the actuator may not be required at this time.

Figure 5:
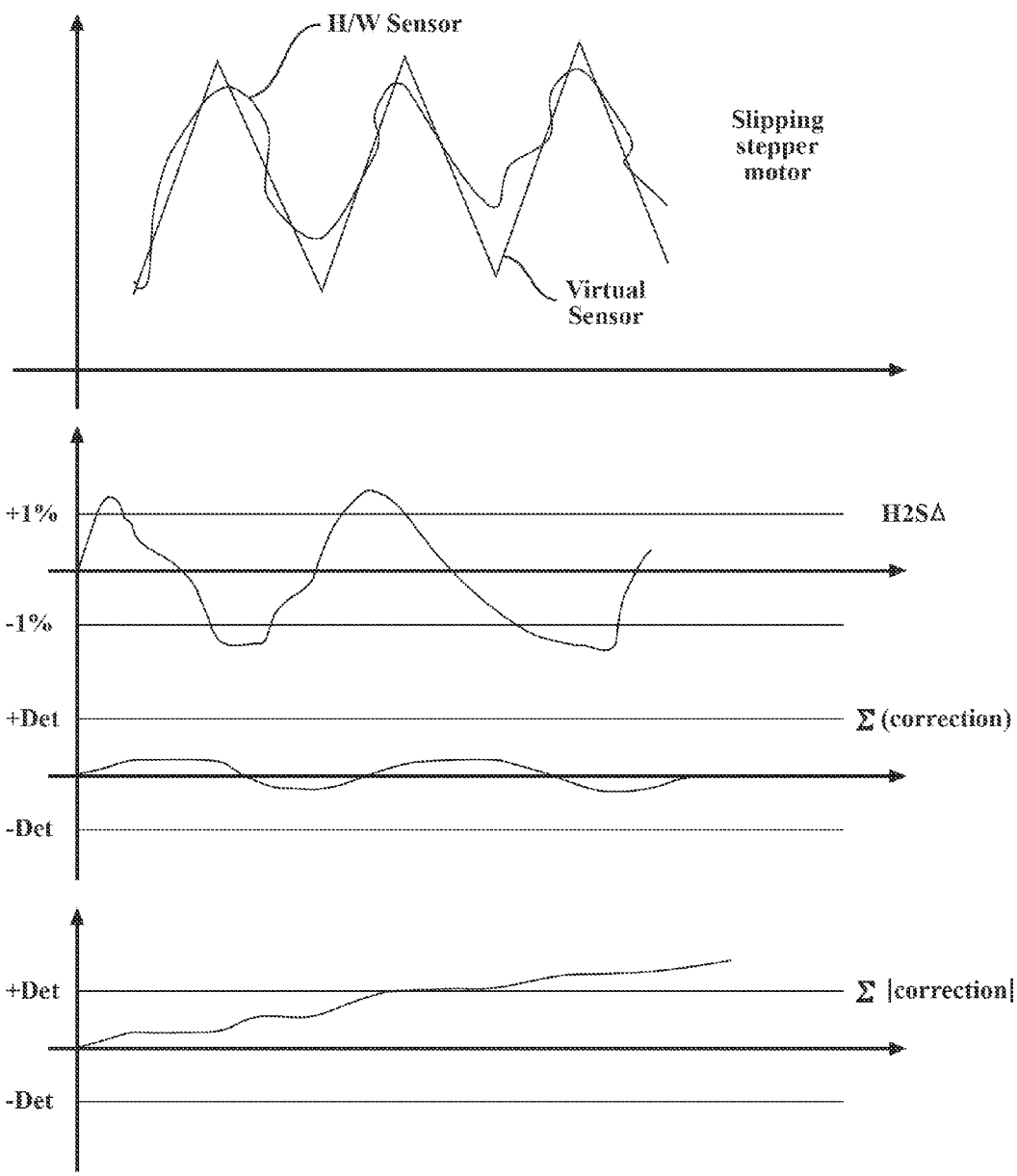
FIG. 5 illustrates operation of an illustrative embodiment of a hybrid sensor in accordance with the teachings of the present application for low level, but persistent motor slipping.

The second example shown in FIG. 5 illustrates low level, but persistent motor slipping. While low level motor slip is not entirely detrimental to control performance, it may make the actuator and the system using the actuator appear sluggish. Even though the QCS corrects the slip on subsequent scans, detection of low level slip is useful to provide an indication of a failing motor which can be corrected during scheduled preventative maintenance. Thus, a motor that is starting to show signs of slippage can be scheduled for replacement before an outright failure impacts headbox performance by causing an unplanned outage. Upon detection of the motor slip using the teachings of the present application, possible actions would be to raise an alarm that the motor is not in optimal condition, raise a flag to increase a torque setting for control of the motor and indicate that there is no need to lockout the motor at this time.

Figure 6:
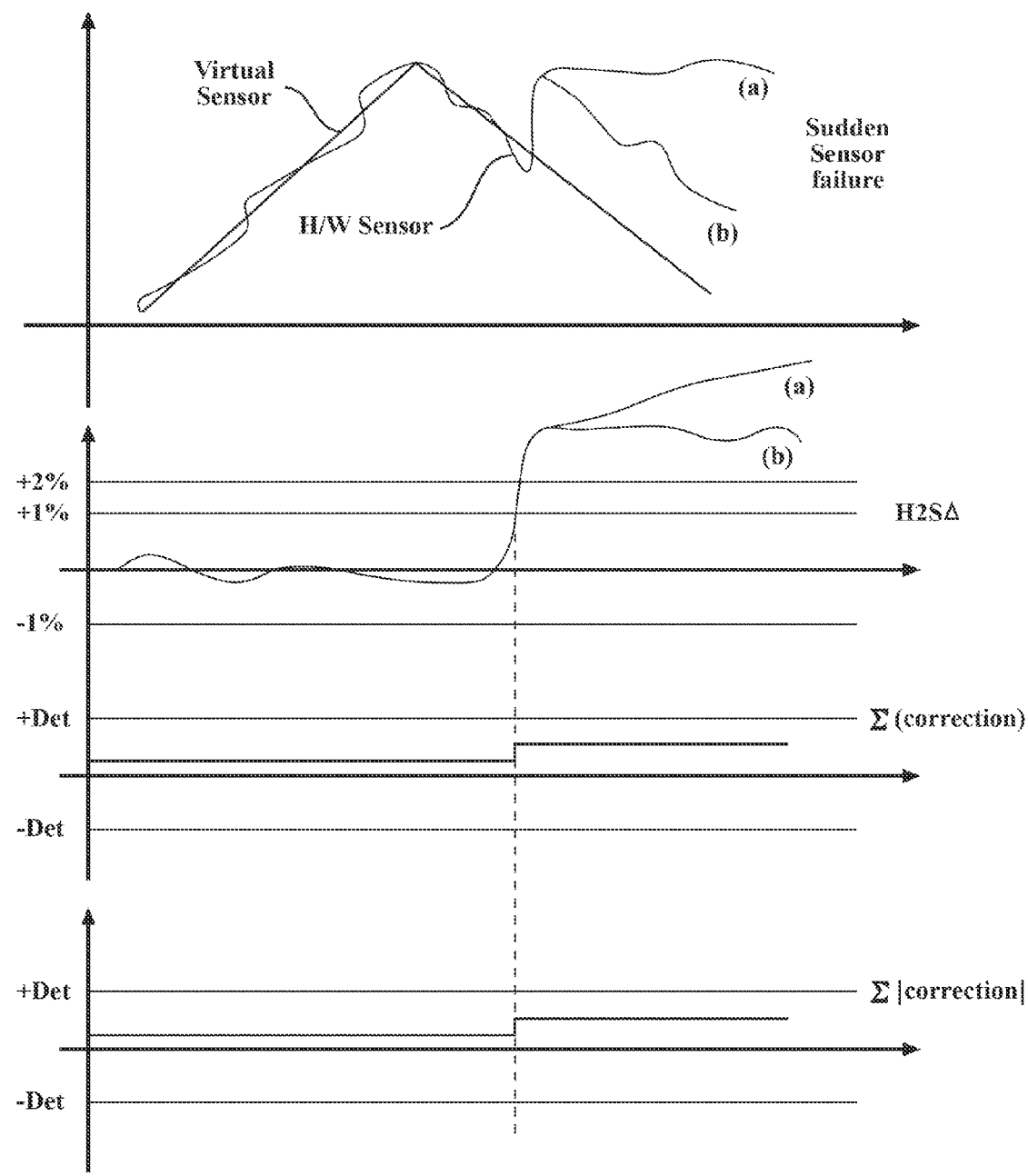
FIG. 6 illustrates operation of an illustrative embodiment of a hybrid sensor in accordance with the teachings of the present application for sudden failure of a hardware sensor.

The third example shown in FIG. 6 illustrates sudden failure of a hardware sensor. Large sensor shifts that are indicative of some hardware failure, target shift or the like, are recognized by large and sudden movement of the H2SΔ statistic. In the case of a failed or failing sensor, the sensor may then stick after the shift as shown at (a) or continue tracking as shown at (b). If the shift in H2SΔ is large enough, periodic corrections will not be applied. For example, during operation of the illustrative embodiment of a hybrid sensor of FIG. 3, periodic corrections will not be applied for a shift in H2SΔ greater than 2% of the range. As is apparent, detection of hardware sensor failures is detected by a comparison of the H2SΔ statistic against limits. A typical alarm response would be an alert that unexpected movement indicative of a broken sensor had occurred. A broken sensor alert typically would result in locking the actuator in place by preventing further step requests from being sent to the actuator. However, when a hybrid sensor in accordance with the teachings of the present application is used, the machine using the actuator can continue to operate at least temporarily using data generated by the virtual sensor.

Figure 7:
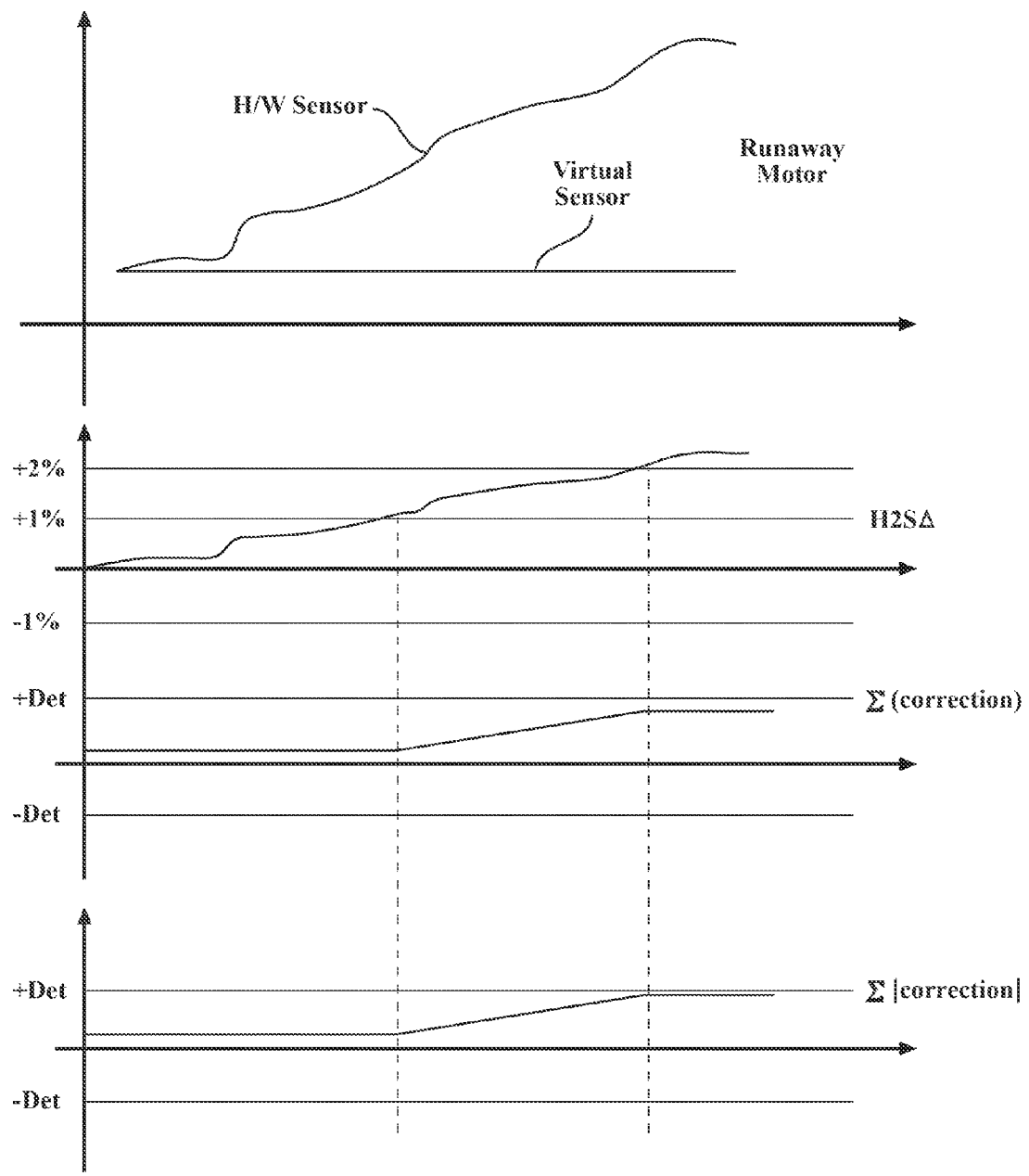
FIG. 7 illustrates operation of an illustrative embodiment of a hybrid sensor in accordance with the teachings of the present application for a runaway motor.

The fourth example shown in FIG. 7 illustrates a runaway motor. In the event a runaway motor occurs, the control system has not requested any steps, so the virtual sensor will not be incrementing. However, the hardware sensor which measures the physical movement of the motor so that H2SΔ registers an increasing value. Periodic corrections to Σ(correction) and Σ|correction| even though they are slow and small, will most likely prevent Σ(correction) and Σ|correction| form reaching the detection limits, ±Det, so it is the H2SΔ limit that is triggered. The control system should take whatever measures are available to stop the runaway, however it is likely that a catastrophic failure of motor driver circuitry has already occurred. Also, upon detection of the motor slip using the teachings of the present application, possible actions would be to disable the stepper driver lines, drive sleep, zero digital to analog converter (DAC) reference voltage to limit current.

Looking at the various examples above, the combination of the observations of the three statistics can be summarized in the following table.

TABLE

Statistics and interpretation.

| H2SΔ @ limit | Σ (correction) @ limit | Σ |correction| @ limit | Diagnosis | Actions |
|---|---|---|---|---|
| <L1 | No | No | Normal operation | Normal operation |
| >L1, <L2 | >Det or | >Det | Slow sensor drift | Indicate failing sensor Continue operation |
| Periodically >L1 always <L2 | Low value | >Det | Low level motor slippage | Indicate failing motor Continue operation |
| >L2 | Low value | Low value | Sudden sensor shift, or stalled motor | Signal failing actuator Motor Lockout |
| >L2 | Increasing value (until L2) | Increasing value (until L2) | Runaway motor | Signal failing actuator Motor lockout |

Note, while there may be some ambiguity in differentiating a sudden sensor shift from a runaway motor (the statistic accumulators may be tricky to place), the large H2SΔ value indicates in both cases that a motor lockout is required. If the periodic correction accumulators detect an error while H2SΔ is below alarm thresholds, normally a slower mode of failure is indicated so that operation of the system can continue, but components should be replaced at the next opportunity. The H2SΔ statistic is the most important for determining when immediate action is required.

Although the invention of the present application has been described with particular reference to certain illustrated embodiments thereof, variations and modifications of the present invention can be effected within the spirit and scope of the following claims. More particularly, the hybrid sensors of the present application combine the best features of each information source in an optimal way, allow for increased tracking of actuator and sensor characteristics for improved/increased diagnostics and allow self-determination of sensor faults, and continued operation of systems using actuators being monitored by the hybrid sensors in limp modes.

Actuators with no or existing sensors do not provide the precision require by modern headbox applications. If sensor failure occurs and is sufficiently abrupt to be noticed, then at best the actuator is locked out and severely reduced headbox performance results. The hybrid sensors of the present application enable intelligent and in-line diagnosis of such faults by allowing the use of the actuator in a limp mode wherein the calculated position from the remaining information source or sources can be used for the continued operation. Slow occurring faults/drifts due to progressive failure of sensors can be masked by the closed nature of typical control applications and may lead to serious damage, for example permanent deformation of the headbox slice. In accordance with the teachings of the present application, because of the continuous cross-referencing between various information sources, slow sensor drifts and failure modes can be captured by the continuous diagnostics.

The hybrid sensors of the present application provide better wideband response of low noise, precision, accuracy and stable measurements in both low dynamic process conditions and fast dynamic process conditions in periods of rapid actuator movements. They also enable increased diagnostics of actuators and sensors. By cross-referencing or fusing sensor information with other information sources, rather than simply comparing sensor information to gross limits, the hybrid sensors of the present application enable continued operation of actuators during periods of partial sensor failure while providing warnings so that suitable maintenance can be performed at the next available opportunity, thereby maximizing uptime of overall control systems.

By combining feedback information from several locations/sources using intelligent data fusion, it is also possible to detect failure modes including abrupt, high noise and drifting failures. If desired, reversion to single sensor operation is possible in the case of a failure of one of two data sources as illustrated. In required high availability circumstances requiring continuous operation, for example in paper machines where machine downtime is extremely expensive, the hybrid sensors enable operation to continue in a reduced or limp mode which is extremely valuable. Further, intelligent combination of data sources with different dynamic properties enables optimal use of the sensor characteristics of low noise, stable precision in slow changing environments, and fast dynamic response for rapid changing process environments.

The data fusion techniques in accordance with the teachings of the present application can be performed either within an actuator unit itself or by a parent system, higher in the control architecture. The fusion techniques can take information from two or more sources, real and/or virtual, in order to provide an optimal hybrid, smart or soft sensor.

What is claimed is:

1. A system for actuator sensor fusion comprising:
   at least one real sensor coupled to an actuator and generating real sensor signals;
   at least one virtual sensor generating virtual sensor signals which define an estimated position of the actuator by continuously tracking signals used to control the actuator; and
   a processor for fusing said real sensor signals and said virtual sensor signals to detect failure of the actuator and/or said at least one real sensor, said processor being configured to use said virtual sensor signals for continued operation of the actuator upon sensed failure of said at least one real sensor.

2. A system for actuator sensor fusion as claimed in claim 1 wherein said processor models said at least one virtual sensor and accumulates historical tracking data representative of control signals sent to the actuator.

3. A system for actuator sensor fusion as claimed in claim 1 wherein said processor is configured for fusing said real sensor signals and said virtual sensor signals by comparing a position of the actuator indicated by said real sensor signals and a position of the actuator indicated by said virtual sensor signals to determine a difference in indicated position of the actuator and to indicate a failure of the actuator and/or said at least one real sensor upon said difference in indicated position exceeding a difference limit.

4. A system for actuator sensor fusion as claimed in claim 1 wherein said processor is configured to accumulate periodic corrections made to said virtual sensor and compare said accumulated periodic corrections to a limit to determine deterioration of the actuator and/or said real sensor.

5. A system for actuator sensor fusion as claimed in claim 4 wherein said processor is configured to apply a forgetting factor ($k_{fp}$) at defined periods of time ($t_{fp}$) to said accumulating periodic corrections so that said accumulating periodic corrections are periodically reduced by a certain proportion of their current values.

6. A system for actuator sensor fusion as claimed in claim 4 wherein said processor is configured to accumulate absolute values of said periodic corrections made to said virtual sensor and compare said accumulated absolute values of said periodic corrections to a limit to determine deterioration of the actuator and/or said real sensor.

7. A system for actuator sensor fusion as claimed in claim 6 wherein said processor is configured to apply a forgetting factor ($k_{fp}$) at defined periods of time ($t_{fp}$) to said accumulating periodic corrections and to apply a forgetting factor ($k_{fp1}$) at defined periods of time ($t_{fp1}$) to said accumulating absolute values of said periodic corrections so that said accumulating periodic corrections and said accumulating absolute values of said periodic corrections are periodically reduced by certain proportions of their current values.

8. A system for actuator sensor fusion as claimed in claim 1 wherein said processor is configured to accumulate the absolute values of periodic corrections made to said virtual sensor and to compare said accumulated absolute values of said periodic corrections to a limit to determine deterioration of the actuator and/or said real sensor.

9. A system for actuator sensor fusion as claimed in claim 8 wherein said processor is configured to apply a forgetting factor ($k_{fp1}$) at defined periods of time ($t_{fp1}$) so that said accumulating absolute values of said periodic corrections are periodically reduced by a certain proportion of their current values.

10. A method for actuator sensor fusion comprising:
    monitoring, using a processor, at least one real sensor coupled to an actuator to generate real sensor signals which define a sensed position of the actuator;
    monitoring, using a processor, at least one virtual sensor which continuously tracks signals used to control said actuator to generate virtual sensor signals which define an estimated position of the actuator;
    fusing, using a processor, said real sensor signals and said virtual sensor signals to detect failure of the actuator and/or said at least one real sensor; and
    continuing to operate the actuator using said virtual sensor signals upon detection of failure of said at least one real sensor.

11. A method for actuator sensor fusion as claimed in claim 10 further comprising:
    modeling said at least one virtual sensor; and
    accumulating historical tracking data representative of control signals sent to the actuator.

12. A method for actuator sensor fusion as claimed in claim 10 wherein fusing said real sensor signals and said virtual sensor signals comprises:
    comparing a position of the actuator indicated by said real sensor signals and a position of the actuator indicated by said virtual sensor signals;
    determining a difference in indicated position of the actuator; and
    indicating a failure of the actuator and/or said at least one real sensor upon said difference in indicated position exceeding a difference limit.

13. A method for actuator sensor fusion as claimed in claim 10 further comprising:
    accumulating periodic corrections made to the virtual sensor; and comparing the accumulated periodic corrections to a limit to determine deterioration of the actuator and/or said at least one real sensor.

14. A method for actuator sensor fusion as claimed in claim 13 further comprising applying a forgetting factor ($k_{fp}$) at defined periods of time ($t_{fp}$) to said accumulating periodic corrections so that said accumulating periodic corrections are periodically reduced by a certain proportion of their current values.

15. A method for actuator sensor fusion as claimed in claim 13 further comprising:
  accumulating the absolute magnitude of periodic corrections made to the virtual sensor; and
  comparing the accumulated periodic corrections to a limit to determine deterioration of the actuator and/or said at least one real sensor.

16. A method for actuator sensor fusion as claimed in claim 15 further comprising:
  applying, using a processor, a forgetting factor ($k_{fp}$) at defined periods of time ($t_{fp}$) to said accumulating periodic corrections; and
  applying, using a processor, a forgetting factor ($k_{fp1}$) to said accumulating absolute values of said periodic corrections at defined periods of time ($t_{fp1}$) so that said accumulating periodic corrections and said accumulating absolute values of said periodic corrections are periodically reduced by certain proportions of their current values.

17. A method for actuator sensor fusion as claimed in claim 10 further comprising:
  accumulating, using a processor, the absolute values of periodic corrections made to said virtual sensor; and
  comparing said accumulated absolute values of said periodic corrections to a limit to determine deterioration of the actuator and/or said real sensor.

18. A method for actuator sensor fusion as claimed in claim 17 further comprising applying, using a processor, a forgetting factor ($k_{fp1}$) at defined periods of time ($t_{fp1}$) so that said accumulating absolute values of said periodic corrections are periodically reduced by a certain proportion of their current values.

* * * * *